United States Patent
Guillez et al.

(10) Patent No.: US 7,513,563 B2
(45) Date of Patent: Apr. 7, 2009

(54) RETRACTABLE ROOF WITH SECURING ELEMENTS AND VEHICLE THUS EQUIPPED

(75) Inventors: Jean-Marc Guillez, Cirieres (FR); Paul Queveau, Montravers (FR); Gérard Queveau, Le Pin (FR)

(73) Assignee: Societe Europeenne de Brevets Automobiles, Paris (FR)

( * ) Notice: Subject to any disclaimer, the term of this patent is extended or adjusted under 35 U.S.C. 154(b) by 371 days.

(21) Appl. No.: 10/516,213

(22) PCT Filed: Aug. 20, 2004

(86) PCT No.: PCT/FR2004/002173

§ 371 (c)(1),
(2), (4) Date: Jan. 27, 2006

(87) PCT Pub. No.: WO2005/028229

PCT Pub. Date: Mar. 31, 2005

(65) Prior Publication Data

US 2006/0125280 A1    Jun. 15, 2006

(30) Foreign Application Priority Data

Sep. 5, 2003   (FR) .................................. 03 10536

(51) Int. Cl.
*B60J 7/185* (2006.01)
*B60J 7/19* (2006.01)

(52) U.S. Cl. .................. 296/121; 296/108; 296/128; 296/131; 296/132; 296/107.17

(58) Field of Classification Search .............. 296/108, 296/121, 124, 128, 131, 132, 107.08, 107.17, 296/112, 115, 117, 107.2; 292/DIG. 5
See application file for complete search history.

(56) References Cited

U.S. PATENT DOCUMENTS

| | | | | |
|---|---|---|---|---|
| 6,786,529 B2 * | 9/2004 | Hasselgruber et al. | ...... | 296/108 |
| 6,799,789 B2 * | 10/2004 | Guillez et al. | ............... | 296/121 |
| 6,832,807 B2 * | 12/2004 | Tezuka | ....................... | 296/128 |
| 6,834,907 B2 * | 12/2004 | Dietl | ........................... | 296/121 |
| 7,341,303 B2 * | 3/2008 | MacNee et al. | ............. | 296/121 |
| 2004/0046416 A1 * | 3/2004 | Heller et al. | ................. | 296/121 |
| 2005/0140165 A1 * | 6/2005 | Heller et al. | ................. | 296/121 |
| 2005/0242617 A1 * | 11/2005 | Guillez et al. | ............... | 296/121 |
| 2005/0264025 A1 * | 12/2005 | Queveau et al. | ............. | 296/108 |
| 2006/0145509 A1 * | 7/2006 | Guillez et al. | .......... | 296/107.08 |

* cited by examiner

*Primary Examiner*—Jason S Morrow
(74) *Attorney, Agent, or Firm*—Daphne L. Burton; Burton IP Law Group (57) ABSTRACT

A roof for a vehicle comprising several roof elements that can be displaced between a first position above the passenger compartment and a second position in which they are stowed inside the boot, the roof elements being, when they cover the passenger compartment, connected to each other and to respectively front and rear parts of the body structure of the vehicle via securing elements controlled by rigid rods driven by an electric motor. These rods are constantly connected to each other in pairs from one of the roof elements to another, as much in the first position as in the second position of these elements, by a cable transmitting the movement generated by the electric motor between the rods and allowing to secure the roof elements to the body structure of the vehicle, as much in their first as in their second positions.

24 Claims, 4 Drawing Sheets

RETRACTABLE ROOF WITH SECURING ELEMENTS AND VEHICLE THUS EQUIPPED

CROSS-REFERENCE TO RELATED APPLICATIONS

This application claims priority to French patent application No. 0310536 filed on or about Sep. 5, 2003. A related application was also filed under the Patent Cooperation Treaty on or about Aug. 20, 2004, as PCT/FR04/02173. The PCT application claims priority to the French patent application.

BACKGROUND OF THE INVENTION

1. Field of the Invention

The invention relates to a displaceable, movable roof, of a vehicle comprising several roof elements in principle rigid, that can be displaced between a first position in which they cover the passenger compartment of the vehicle and a second position in which they expose this passenger compartment. It also relates to a convertible vehicle with a roof folding away towards the rear of the vehicle.

Generally, in said second position, the roof is stowed in the rear boot of the vehicle.

Such a roof notably allows to transform a saloon or coupe type vehicle into a convertible type vehicle.

2. Description of the Related Art

More precisely, it is a roof notably comprising a front roof element and a rear roof element, displaceable between their said first and second positions, the roof elements being, when they cover the passenger compartment, connected to each other and to respectively (and preferably) the front and rear parts of the body structure of the vehicle via locking means controlled by rigid rods extending along the roof elements and being driven by controlling means.

Such a solution was disclosed in WO-A-02/064391.

However, when the roof elements are in their second position, retracted roof, their holding into position is not as yet considered to be (sufficiently) ensured. In particular, their securing can not be controlled in a sufficiently appropriate manner in respect to the boot walls or more generally to the surrounding body structure of the vehicle, in order to efficiently hold them in this position for the desired length of time.

SUMMARY OF THE INVENTION

In accordance with one embodiment of the present disclosure, a displaceable roof is provided on a vehicle having a front edge and a rear edge and comprising a passenger compartment and a body structure comprising front and rear parts. The displaceable roof includes a front roof element and a rear roof element both displaceable between a first position in which they cover the passenger compartment and a second position in which the passenger compartment is at least partly exposed, the front roof and rear roof elements being, when they cover the passenger compartment, connected to each other and to respectively said front and rear parts of the body structure through locking means controlled by rigid rods extending along the front and rear roof elements and being driven by controlling means, wherein the rigid rods are constantly connected to each other in pairs from one of the front and rear roof elements to another, as much in the first position as in the second position of said front and rear roof elements, by flexible means transmitting a movement generated by the controlling means between the rigid rods and thus allowing to secure said front and rear roof elements to the body structure of the vehicle, as much in their first as in their second positions.

In accordance with another embodiment of the present disclosure, provided is a convertible vehicle having a front edge, a rear edge and comprising: a passenger compartment; a body structure comprising front and rear parts; a roof comprising a front roof element and a rear roof element, both displaceable between a first position in which they cover the passenger compartment and a second position in which the passenger compartment is at least partly exposed, the front roof and rear roof elements being, when they cover the passenger compartment, connected to each other and to respectively said front and rear parts of the body structure, through locking means controlled by a plurality of rigid rods extending along said front and rear roof elements and being driven by controlling means, wherein the rigid rods are constantly connected to each other in pairs from one of the front and rear roof elements to another, as much in the first position as in the second position of said front and rear roof elements, by flexible means transmitting a movement generated by the controlling means between the rigid rods and thus allowing to secure said front and rear roof elements to the body structure of the vehicle, as much in their first as in their second positions.

BRIEF DESCRIPTION OF THE DRAWINGS

An even more detailed description of the invention follows, in reference to the annexed drawings by way of examples and in which.

DETAILED DESCRIPTION OF THE INVENTION

One purpose of the invention is to be able to control the means for securing the roof elements when the passenger compartment is exposed.

A corollary purpose is to allow the securing of the roof elements once stowed in their second position (convertible position) by using the same securing control with its motor as when the roof elements are deployed above the passenger compartment.

Another corollary purpose is to propose a mechanical solution for a car that is reliable and simple to implement and mass produce.

According to the invention, at least some of these aims are reached by organising that the rods controlling the locking means are constantly connected to each other, in pairs, from one of the roof elements to another, as much in the first position as in the second position of these roof elements, by flexible means transmitting between these rods the movement generated by the controlling means and thus allowing to secure said roof elements to the body structure of the vehicle, as much in the first as in the second positions.

For the sake of reliability and efficiency, we suggest that the (each) flexible means comprises a cable adapted for transmitting a rotary movement controlled by one of the rods to which it is connected, this rod itself being rotated by the controlling means.

In the sought after purpose of a mechanical solution for a car that is reliable and simple to implement and mass produce, in association with a side by side storage of the roof elements (these elements thus being preferably placed substantially horizontal, stacked one on top of the other), another characteristic of the invention envisages that advantageously, as much to secure, in a free manner, the roof elements together, whilst they are above the passenger compartment of the vehicle, as to secure at least some of them to said front and rear parts of the body structure of the vehicle (such as the internal walls of a boot) in the "convertible" position, the rigid rods comprise at least two rods for each roof element to be secured, these rods being threaded and together under the control of intermediary transmitting means rotated by said cable(s), said rods extending from this intermediary transmitting means along two opposing directions until passed the respectively front and rear ends of the concerned roof element, preferably along a direction substantially parallel to the longitudinal direction of the vehicle, each of these rods ending with a screwed nut, this nut being connected to a locking connector thus controlled in translation along said longitudinal direction of the vehicle in order to engage, or disengage, one of said front or rear parts of the body structure.

Benefiting from the solution provided for securing in respects to the body structure of the vehicle, the invention thus rose the question of securing the roof elements together whilst they are above the passenger compartment.

It is for this reason that it is proposed, in order to secure said roof elements together, whilst they cover the passenger compartment, in continuity to each other, that the nut connected to one of the rods of one of the roof elements defines a locking tab put into motion by the rod and adapted for hooking a complementary locking means fixed to another of the roof elements, the locking tab being movable under the control of said rod itself driven by the concerned cable, in order to engage, or disengage, the complementary locking means, whilst the roof elements are placed in continuity to each other above the passenger compartment.

As an alternative or as a complement, we even propose that, with the roof closed, to secure the front roof element to a zone of the body structure immediately next to the windscreen of the vehicle, whilst the roof elements are substantially aligned in continuity to each other, the nut connected to one of said threaded rods connected to a front roof element bears a attaching means, mounted, in a movable manner, on the nut, under the control of said threaded rod, so as to freely co-operate with a complementary attaching means fixed to said zone of the body structure close to the windscreen of the vehicle.

As regards detailed solutions that are particularly appropriate to the context of the invention, we further note that:

advantageously, to secure two of said roof elements to each other in the first position, the rod (or at least one of the rods) connected to the controlling means fixed to one of these roof elements will be threaded and connected to a locking tab attached to said locking means for securing the roof elements to each other, this tab defining a nut put into motion by this rod and being adapted for co-operating with a complementary locking means fixed to the other roof element, the locking tab being movable in translation under the control of the controlling means in order to engage, or disengage, the complementary means, whilst said roof elements are placed in continuity to each other, the rotating of the threaded rod driving the corresponding flexible cable which connects this rod to (at least) another rod supported by the other roof element to be secured;

the roof elements can comprise an intermediate roof element, between the front and rear roof elements, the front roof element being displaceable above the passenger compartment to maintain a closed position in which it substantially extends in continuity from the rear roof element, between itself and a zone of said front part of the body structure immediately next to the windscreen of the vehicle, the roof elements being, in addition, displaceable together so as to expose the passenger compartment and maintain a side by side position;

to secure, in this case, two of said roof elements to each other in the first position, at least one of said rods supported by one of these elements will advantageously be threaded and connected, on one side, to the flexible cables, via pinions meshing together and of which one is rotated by said cable;

and, on another side, to a locking tab attached to said locking means for securing the roof elements to each other, this tab defining a nut put into motion by the rod and being adapted for co-operating with a complementary locking means fixed to the other roof element, the locking tab being movable in translation in order to engage, or disengage, the complementary means, whilst said concerned roof elements are placed in continuity to each other;

to secure in the stowed position an intermediate roof element to a zone of the body structure of the vehicle, in the boot, a complementary rod will advantageously project from the locking tab connected to the intermediate roof element, in the direction of said zone of the body structure, this complementary rod being fitted, at one end, with a pin which moves with said nut, this pin engaging, or disengaging, a housing fixed to said zone of the body structure, depending on the displacement direction of the nut;

to secure the front roof element to a zone of the body structure close to the windscreen of the vehicle, whilst said roof elements are in their first position, with the front roof element placed substantially in the continuity of the rear roof element, the rod (or at least one of the rods), preferably threaded, supported by the roof element, is connected:

on one side, to one of the flexible cables, via pinions meshing together and of which one is rotated by said cable;

and, on another side, to a connecting nut driven in translation by the rod and thus being displaced in a body fixed to the front roof element, a locking hook attached to said locking means being swivel mounted onto the body, its swivel movement being controlled by the displacement in translation of the nut, so that the hook engages with, or disengages from, a complementary securing part fixed to the body structure;

to secure the front roof element to a part of the body structure of the vehicle, whilst this front roof element is stowed in the boot next to the rear roof element, the corresponding threaded rod will extend preferably passed the body bearing the locking hook, in order to rotate a nut placed at its free end and on which a pin is mounted adapted for engaging, or disengaging, a housing made in the corresponding wall of the body structure;

and to secure one of said roof elements to a first and a second zone of the body structure of the vehicle when this roof element is stowed in the boot with the rear roof element, the pinion rotated by the concerned flexible cable will engage preferably with two other pinions, of which one is connected to the corresponding rigid rod, the rotating of this rod controlling the translation of the nut connected to it, this nut, in addition, being connected to a locking pin projecting in the direction of said first zone, so that the rotating of said threaded rod engages or disengages the locking pin in respect to this zone, and of which the other one controls the rotating of an additional threaded rod connected at its free end to an additional locking pin fixed to an additional nut screwed to the rod, so that this additional pin engages with, or disengages from, said second zone, thus securing the concerned roof element in this position to these two different zones of the body structure.

Figure 1:
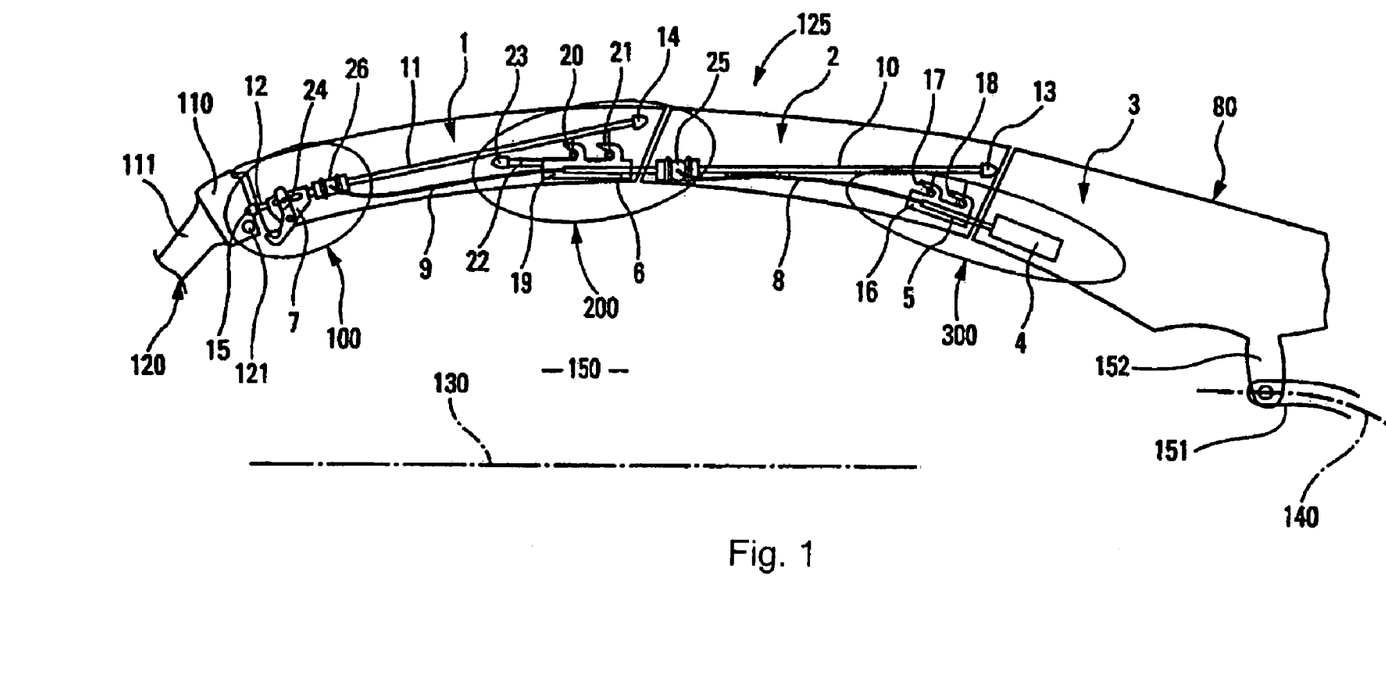
FIG. 1 is a longitudinal section of a retractable rigid roof fitted with a locking system in accordance with the invention.

In the example in FIG. 1, the roof elements (in principal rigid) 1, 2 and 3 are secured to each other via locking means 100, 200 and 300.

The locking element 100 allows to secure the front roof element 1 to the cross beam 110 of the windscreen 111. The locking element 200 allows to secure the front 1 and intermediate 2 roof elements to each other. The locking element 300 allows to secure the intermediate 2 and rear 3 roof elements to each other.

A controlling means, in this case a single electric motor 4, rotates a rigid rod 5, in this case threaded. The motor is located in the rear roof element 3.

A nut (or locking tab) 16 is mounted onto the threaded rod 5 and is displaced in a parallel manner in relation to the longitudinal direction 120 of the vehicle (marking 125). On the upper part of the nut 16 are two hooks 17 and 18 which secure the rear roof element 3 to the intermediate roof element 2. Hook keepers 31 and 33 integral in points 30 and 32 to the rear part of the intermediate roof allow securing by means of the hooks 17 and 18.

A first flexible element advantageously constituted by a twisted cable 8 (normally metallic) is connected at its rear part 8*a* to the front part 5*a* of the rod 5, in order to transmit a rotary movement controlled by this rod.

Figure 5:
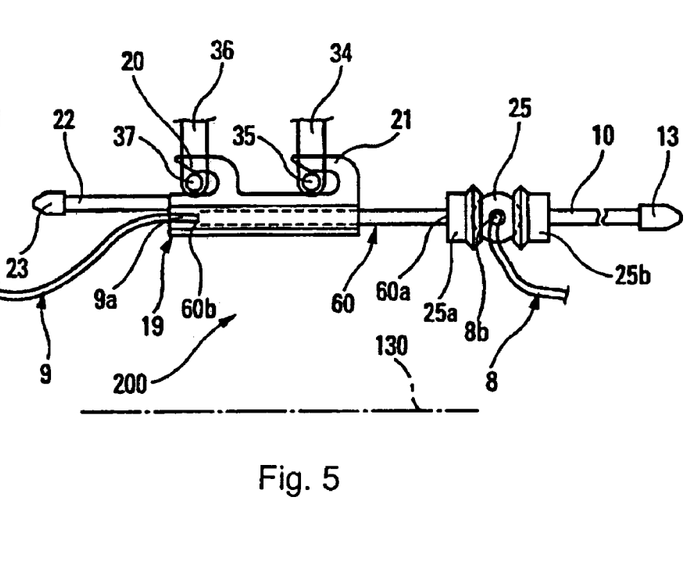
FIG. 5 is an expanded view of the securing device located between the front roof element and the intermediate roof element in FIG. 1 (marking V)
Figure 6:
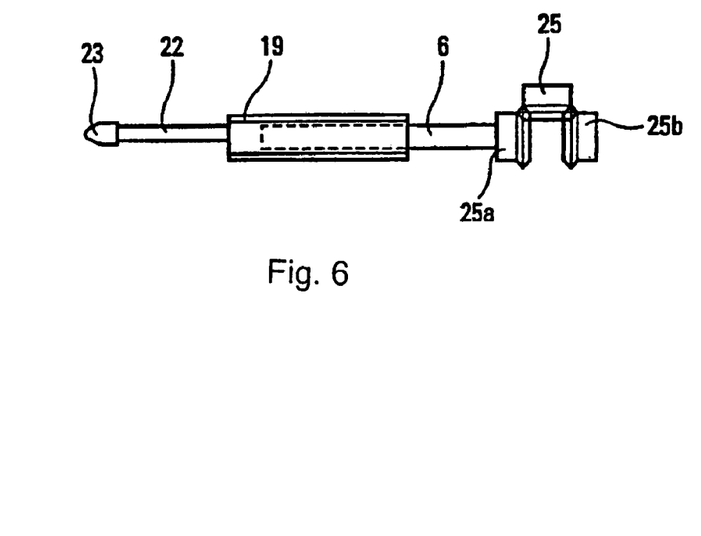
FIG. 6 is a top view of FIG. 5.
Figure 7:
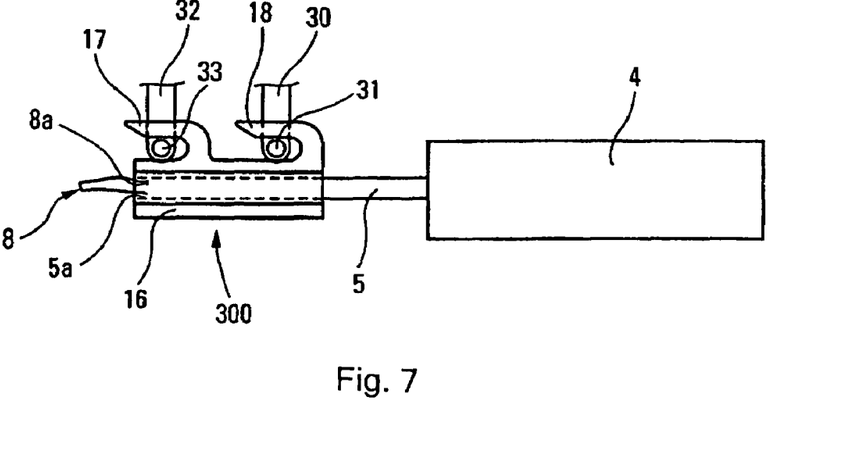
FIG. 7 is an expanded view of the securing device located between the intermediate roof element and the rear roof element in FIG. 1 (marking VII)

When the rod 5 starts rotating, it rotates the flexible part 8. The front part 8*b* of the flexible part 8 is connected to one of the parts of the locking means 200. Thus, this end 8*b* of the flexible part 8 drives a first conical pinion 25 which rotates a second conical pinion 25*a* (FIG. 5). This second pinion 25*a* itself rotates a second threaded rod 60 (identical to rod 5) and which is connected at its rear part 60*a* to the conical pinion 25*a*. The rod 60 drives, in parallel to the longitudinal axis 130 of the vehicle, a nut 19 (creating a second locking tab). On the upper part of the nut 19 there are two hooks 20 and 21 which secure the intermediate roof element 2 with the front roof element 1. Hook keepers 35 and 37 integral in points 34 and 36 to the rear part of the front roof 1 allow securing by means of the hooks 20 and 21.

Figure 3:
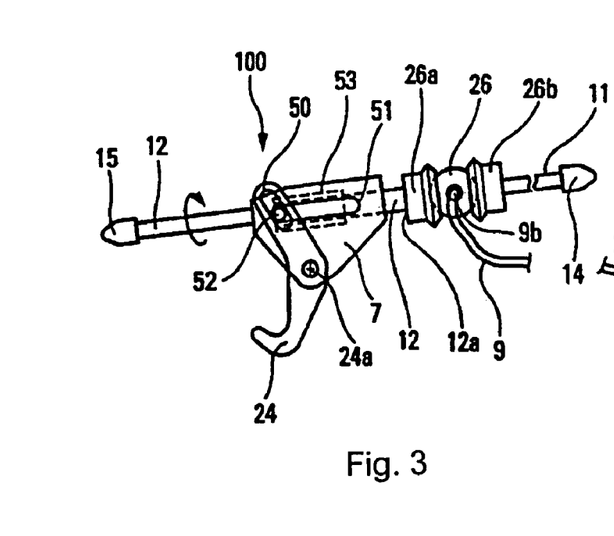
FIG. 3 is a localised and expanded view of the securing device located at the front of FIG. 1 (marking III)

A second flexible part 9 is connected at its rear part 9*a* to the front part 60*a* of the locking rod 60. When this rod 60 starts rotating, by means of the flexible part 8, it rotates the flexible part 9. The front part 9*b* of the flexible part 9 is connected to a part of the means for locking 100 between the front roof element 1 and the cross beam of the windscreen. The front end 9*b* of the flexible part 9 drives a first conical pinion 26 which rotates a second conical pinion 26*a* (FIG. 3). This second conical pinion itself rotates a third threaded rod 12 which is connected at its rear part 12*a* to the conical pinion 26*a*. The rod 12 drives, in parallel to the longitudinal axis of the vehicle, a nut 53. The nut 53 has two stubs 52 and 52' on its side edges extending perpendicularly in relation to the longitudinal axis 130 of the vehicle. The nut 53 is displaced axially in the body 7 fixed to the front roof element 1. The two stubs 52 and 52' are displaced in two grooves 51 and 51' of the body 7. A hook 24 is swivel mounted onto the element 7, along an axis of rotation 24*a* perpendicular to the axis 130. The hook 24 is driven by the stub 52 which is displaced in a groove 50 located on the top of the hook. The hook 24 allows to secure the front roof element 1 to the cross beam of the windscreen and therefore to the frame (FIG. 1). A hook keeper 121 can be fitted for this purpose to the cross beam.

It is to be noted that we give the name "frame" or "bodywork" or even "body structure" of the vehicle to any structural part to which one or several roof elements can be fixed. Thus not only a slider (such as 151 in FIG. 1 envisaged to guide the in/out movement of the rear element 3) or the cross beam of the windscreen 110, but also, when the vehicle is in the convertible position, the inside of the boot, or a cradle held in this boot to house said roof elements or even the means for tilting the roof disclosed in the French patent application filed under N° FR 0 209 217 in the name of France Design, are notably concerned.

The part(s) of the frame 120 where the roof is secured side by side to the roof elements (particularly in the stacked position in FIG. 2) can therefore in particular correspond to the inside walls of the boot or to those of a cradle housing said roof elements in the side by side position, preferably horizontally (stacked elements as in FIG. 2), this cradle can be movable in relation to the bodywork.

Figure 2:
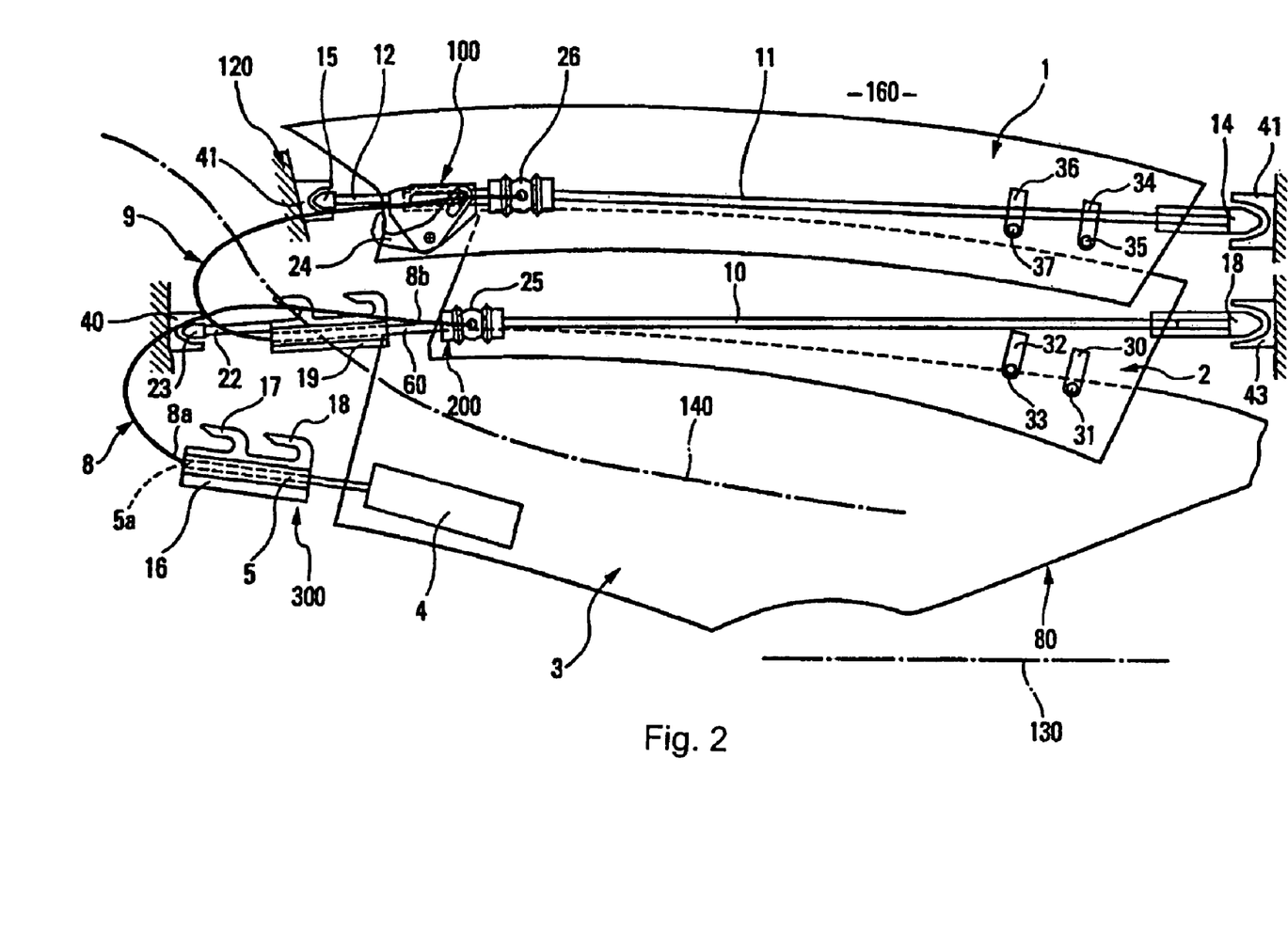
FIG. 2 is a longitudinal section of a retractable roof stowed in the rear boot of the vehicle.

In the example in FIG. 2, the rigid roof elements 1, 2 and 3 are, in the stacked position, stowed in the rear boot of the vehicle and secured to its inside side walls, via the locking elements 100, 200 and 300.

To secure the concerned roof elements to the "frame", in this side by side position of the elements, we note that the electric motor 4 secures the intermediate 2 and front 1 roof elements to this frame 120, the rear element 3 being held by its sliding connection to the slider(s) 151 and preferably to at least one complementary drive arm (not represented).

Figure 8:
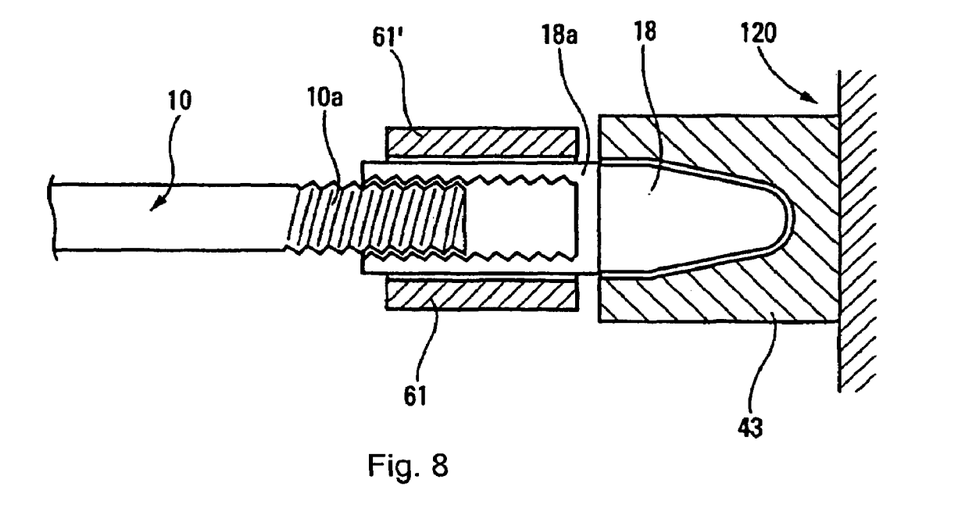
FIG. 8 is a view of the means for locking the roof elements stowed in the rear boot of the vehicle.

The motor drives the first threaded part 5, which rotates the flexible part 8. The front part 8*b* of the flexible part 8 rotates the first conical pinion 25 which itself drives the third conical pinion 25*b* (FIG. 5). This third pinion itself rotates the threaded rod 10. The front edge 10*a* of this rod 10 drives the nut 18*a* in translation in the axis 130 (FIG. 8). The pin 18 is fixed to the nut 18*a* and positions itself in a housing 43 fixed to the frame 120. The rear part of the intermediate roof 2 is then secured to the frame. Fixed walls 61 and 61' (which can be connected to the element 2) jam the rotation of the nut 18*a*.

To secure the front part of this roof element 2 to the frame, the first conical pinion 25 drives the second conical pinion 25*a* which itself rotates the threaded rod 60. The nut 19 is then displaced in translation. A rod 22 is mounted to the front end of the nut 19 with, at its front end, a pin 23 which is displaced with the nut 19 along the longitudinal direction 130 of the vehicle. The pin 23 engages, in the open roof position (FIG. 2), into a housing 40 fixed to the frame.

As for the securing of the front element 1 to this frame, still in the side by side position of the roof elements (FIG. 2), it is performed as follows:

The rotating of the rod 5 drives that of the second flexible part 9, via the first flexible part 8. The front part 9*b* of the flexible part 9 rotates the pinion 26 which in turn drives the third conical pinion 26b (FIG. 3). The pinion 26b then rotates the threaded rod 11 which extends along the direction 130, in the opposite direction to the rod 12. Just as is illustrated in FIG. 8 and as already disclosed to secure the rear element 2 (rod 10), the rear end of the threaded rod 11 drives in translation a nut along the axis 130. A pin 14 is fixed to the nut. This pin 14 positions itself in a housing 42 fixed to the frame 120. The rear part of the front roof 1 is then secured to the frame.

Figure 4:
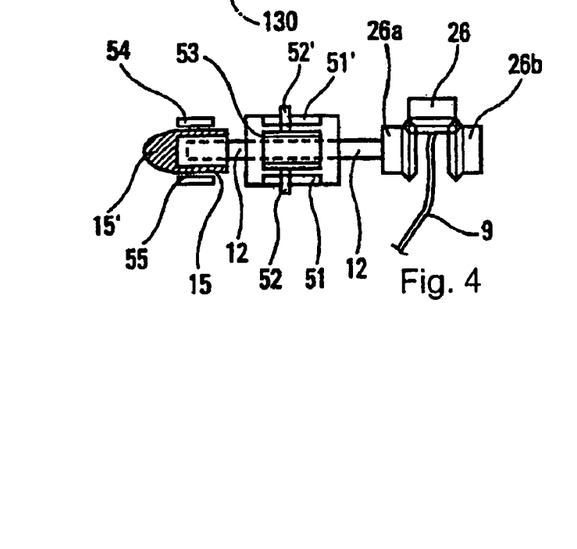
FIG. 4 is a top view of FIG. 3.

Furthermore, the first conical pinion 26 also drove the second conical pinion 26a which itself rotated the third threaded rod 12 (FIG. 4). The front end of the rod 12 drove in translation a nut 15 on which a locking pin 15' is mounted which engages in a housing 41 fixed to the frame 120. Fixed walls 54 and 55 (which can be supported by the element 1) jam the rotation of the nut.

The front part of the front roof 1 is then secured to this frame.

In the above and in the figures, the roof 80 of the vehicle 125 comprises three roof elements 1, 2 and 3 thus adapted so that the front 1 and intermediate 2 elements displace in relation to each other, as well as in relation to the rear roof element 3 between an "aligned" or "closed" position in which the three roof elements are substantially arranged in continuity, as illustrated in FIG. 1, and an "open" or "off-set" position (FIG. 2) in which the elements 1 and 2 were displaced in order to be stowed side by side with the element 3, and stacked in a substantially horizontal position.

To move from the position in FIG. 1 to that in FIG. 2 (convertible position), i.e. stow all the roof elements, by retracting them to the inside of the bodywork, we have diagrammatically illustrated in FIG. 2 the path 140 that we can make the rear roof element 3 follow (and subsequently therefore elements 1 and 2) to displace it between its stowed position in the boot 160 (as in the figure) and its deployed position in FIG. 1 in which it covers at least a part of the passenger compartment 150, the path 140 can notably be materialised in the shape of at least one slider as diagrammatically marked 151 and in part in FIG. 1.

By means of this slider, to which the rear element 3 is connected by a tab 152, the element 3 is constantly connected to the body structure 120 of the vehicle in respect to which it articulates therefore between its deployed (first position) and stowed positions (second position as in FIG. 2).

Of course, a number other than three roof elements can be envisaged. Thus, the roof 80 could only, in particular, comprise one front element 1 directly connected to the rear of the rear element 3.

We could also possibly envisage that the roof elements are stowed, not in a horizontal position as planned but, in an inclined or even vertical position, in the rear boot.

Alternatively, we must also consider that the screw/nut system located at the end of the rods 10, 11 and 12 could be integrated elsewhere, for example on the inside of the body 7 in respect to the locking connector 15, the important factor being to ensure a movement in translation in the chosen locking/unlocking direction and therefore be able to engage/disengage at will the ends of these rods in relation to the concerned zone of the body structure, in the stowed (or ready for stowing) side by side position of the roof elements.

Yet again to be noted in FIG. 2, the roof elements are stacked with the lower concavity or the curved profile of the two elements 1 and 2 directed downwards. We can however envisage an "inverse" position of these elements, one curved upwards the other downwards, the turning over of one of the elements being performed during the movement between the position in FIG. 1 and the stowed position in the boot.

We also note that in the above, the locking means that were presented can laterally concern but only half of the vehicle. Thus, in actuality we preferably find them duplicated by symmetric axis (axis 130) between the left and right parts of the vehicle. Concerning the controlling means 4, we can moreover envisage a single motor for the two sets of left and right rods and cables of the vehicle with a flexible cable such as cables 8 and 9 interposed between the outlet of the motor and each first rod 5.

Other types of vehicle than the one illustrated are of course concerned with the invention. They could be vehicles with "integrated boots" such as mini-van vehicles or even pickup type vehicles.

In their said second position (stowed position, exposed passenger compartment), the roof elements can additionally be placed above a rear boot zone, the important factor being that a structural part of the vehicle is located in the surroundings of said roof elements in this position so that they can then be secured (of course in a free manner as we have understood).

Thus, a positioning of the roof elements in their stowed position, exposed passenger compartment, above (or more frequently to the outside of) the bodywork of the vehicle, typically behind the passenger compartment, is possible.

Generally speaking, as regards the flexible means transmitting the movement generated by the controlling means between the rods to secure the roof elements in their first and second positions, it is clear that a motion other than rotation can be envisaged, thus a different solution to that specifically illustrated. Thus, a movement in translation is notably envisaged, for example by using a worm solution, or any other solution already proposed in the prior art, of rigid rod type or cable adapted for transmitting a movement of axial displacement comparable to a translation (see the solution already proposed combining a worm rod with a pinion or a solution via traction or thrust cable resistant to the compression).

A mechanism as in DE-A-10242725 can also be used.

The invention claimed is:

1. On a vehicle having a front edge and a rear edge and comprising a passenger compartment and a body structure comprising front and rear parts, a displaceable roof including a front roof element and a rear roof element both displaceable between a first position in which they cover the passenger compartment and a second position in which the passenger compartment is at least partly exposed, the front roof and rear roof elements being, when they cover the passenger compartment, connected to each other and to respectively said front and rear parts of the body structure through locking means controlled by rigid rods extending along the front and rear roof elements and being driven by controlling means, wherein the rigid rods are constantly connected to each other in pairs from one of the front and rear roof elements to another, as much in the first position as in the second position of said front and rear roof elements, by flexible means transmitting a movement generated by the controlling means between the rigid rods and thus allowing to secure said front and rear roof elements to the body structure of the vehicle, as much in their first as in their second positions.

2. A convertible vehicle having a front edge, a rear edge and comprising:
   a passenger compartment,
   a body structure comprising front and rear parts,
   a roof comprising a front roof element and a rear roof element, both displaceable between a first position in which they cover the passenger compartment and a second position in which the passenger compartment is at least partly exposed, the front roof and rear roof elements being, when they cover the passenger compartment, connected to each other and to respectively said front and rear parts of the body structure, through locking means controlled by a plurality of rigid rods extending along said front and rear roof elements and being driven by controlling means, wherein the rigid rods are constantly connected to each other in pairs from one of the front and rear roof elements to another, as much in the first position as in the second position of said front and rear roof elements, by flexible means transmitting a movement generated by the controlling means between the rigid rods and thus allowing to secure said front and rear roof elements to the body structure of the vehicle, as much in their first as in their second positions.

3. The vehicle set forth in claim 2, wherein the body structure of the vehicle includes a bodywork, and the roof is retracted inside the bodywork, in the second position of the roof elements.

4. The vehicle set forth in claim 2, wherein:
the body structure of the vehicle locally defines a rear boot, and
in the second position the front and rear roof elements are retracted inside the rear boot.

5. The roof set forth in claim 1, wherein the flexible means comprise a cable adapted for transmitting a rotary movement controlled by one of the rods to which it is connected, said rod itself being rotated by the controlling means.

6. The roof set forth in claim 1, wherein:
the vehicle further comprises a windscreen,
the front roof element is displaceable above the passenger compartment to close it, in said first position in which said front roof element substantially extends in continuity from the rear roof element, between said rear roof element and a zone of said front part of the body structure immediately next to the windscreen;
  the front and rear roof elements are, in addition, displaceable together so as to be arranged side by side in said second position;
  the flexible means comprise a flexible cable which extends between the front and rear roof elements where it is connected to at least one of said corresponding connecting rods; and
  the controlling means comprise a motor connected to one of said rods in order to transmit the controlling.

7. The roof set forth in claim 1, wherein:
the flexible means comprise flexible cables, and,
to secure said front and rear elements to each other in the first position, one of said rigid rods connected to the controlling means fixed to one of said front and rear roof elements is threaded and connected to a locking tab attached to said locking means adapted for securing the front and rear roof elements to each other, said locking tab defining a nut put into motion by said rigid rod and being adapted for reversibly engaging complementary locking means fixed to the other roof element, the locking tab being movable under the control of the controlling means in order to engage, or disengage, the complementary locking means, whilst said front and rear roof elements are placed substantially in continuity to each other, so that a movement of the threaded rod drives the corresponding flexible cable which connects said threaded rigid rod to at least another threaded rod supported by the other of said front and rear roof elements to be secured.

8. The roof set forth in claim 7, wherein:
the locking tab is movable in translation under the control of the controlling means, and
the movement of the threaded rod is a rotation.

9. The roof set forth in claim 1, wherein:
the vehicle further comprises a windscreen,
the flexible means comprise a plurality of flexible cables,
  the displaceable roof further comprises an intermediate roof element, between the front and rear roof elements;
  the front roof element is displaceable above the passenger compartment to close it in said first position in which it substantially extends in continuity from the rear roof element, between itself and a zone of said front part of the body structure immediately next to the windscreen;
  the front, rear, and intermediate roof elements are, in addition, displaceable together so as to be arranged side by side in said second position;
  the flexible cables extend between two successive of said front, rear, and intermediate roof elements, and the connecting rods to which said flexible cables are connected at one or other of their ends extend along said two successive roof elements;
  the controlling means comprise a motor fixed to one of said front rear, and intermediate roof elements and connected to the corresponding flexible rod in order to transmit a rotation;
  to secure two of said roof elements to each other in the first position, at least one of said rods supported by one of said roof elements is threaded and connected:
    on one side, to one of the flexible cables, via pinions meshing together and of which one is rotated by said cable;
    and, on another side, to a locking tab attached to said locking means adapted for securing the roof elements to each other, said locking tab defining a nut put into motion by the rod and being adapted for reversibly engaging complementary locking means fixed to the other roof element, the locking tab being movable under the initial control of the controlling means in order to engage, or disengage, the corresponding complementary locking means, whilst said two roof elements are placed in continuity to each other.

10. The vehicle set forth in claim 2, wherein:
the flexible means comprise cables,
the vehicle further comprises a windscreen,
the displaceable roof further comprises an intermediate roof element, between the front and rear roof elements;
the front roof element is displaceable above the passenger compartment to close it in said first position in which said front roof element substantially extends in continuity from the rear roof element, between itself and a zone of said front part of the body structure close to the windscreen,
the front, rear, and intermediate roof elements are, in addition, displaceable so as to be arranged side by side in said second position,
the flexible cables extend between two successive of said front, intermediate, and rear roof elements, and the connecting rods to which said flexible cables are connected at one of their ends extend along said two successive roof elements,
to secure two of said roof elements to each other in the first position, at least one of said rods supported by one of said roof elements is threaded and connected:
  on one side, to one of the flexible cables, through pinions meshing together and of which one is rotated by said cable;

and, on another side, to a locking tab attached to said locking means adapted for securing the roof elements to each other, said locking tab defining a nut put into motion by the rod and being adapted for reversibly engaging complementary locking means fixed to the other roof element, the locking tab being movable under the control of the controlling means in order to engage, or disengage, the corresponding complementary locking means.

11. The vehicle set forth in claim 10, wherein the locking tab is movable in translation under the control of the controlling means.

12. The vehicle set forth in claim 2, wherein:

the vehicle further comprises a windscreen, the flexible means comprise a plurality of flexible cables, and to secure the front roof element to a zone of the body structure close to the windscreen, whilst said roof elements are in their first position, with the front roof element placed substantially in the continuity of the rear roof element, at least one of the rods supported by the front roof element is threaded and connected:

on one side, to the flexible cables (9), through pinions meshing together and of which one is rotated by said cable;

and, on another side, to a connecting nut driven by the rod and thus being displaced in a body fixed to the front roof element, a locking hook attached to said locking means being swivel mounted onto the body, its swivel movement being controlled by a displacement in translation of the nut, so that the locking hook engages, or disengages, a complementary locking part fixed to the body structure.

13. The vehicle set forth in claim 12, wherein, to secure the front roof element to a part of the body structure, whilst said front roof element is next to the rear roof element, said corresponding threaded rod extends past the body bearing the locking hook, in order to rotate a nut placed on a free end thereof and on which a pin is mounted for engaging, or disengaging, a housing made in said part of the body structure.

14. The roof set forth in claim 7, wherein:

the vehicle further comprises a windscreen, the roof elements further comprise an intermediate roof element, between the front and rear roof elements; and the front roof element is displaceable above the passenger compartment to close it in said first position, in which it substantially extends in continuity from the rear roof element, between itself and a zone of said front part of the structure close to the windscreen;

the roof elements are, in addition, displaceable together so as to be arranged side by side in said second position;

and, to secure in said second position the intermediate roof element to a zone of the body structure of the vehicle, a complementary rod projects from the locking tab connected to the intermediate roof element in the direction of said zone of the body structure, said complementary rod being fitted, at one end, with a pin which moves with said nut, said pin engaging, or disengaging, a housing located on said zone of the body structure, depending on the displacement direction of the nut.

15. The vehicle set forth in claim 10, wherein:

the flexible means comprise flexible cables, and, to secure one of said roof elements to a first and a second zone of the structure of the vehicle when the roof elements are in their second position, the pinion rotated by the concerned flexible cable engages with two other pinions, of which one is connected to the corresponding rigid rod, the rotating of which controls the translation of the nut connected thereto, said nut, in addition, being connected to a locking pin projecting in the direction of the first zone of the body structure, so that the rotating of said threaded rod engages or disengages the locking pin with respect to said first zone, and of which the other one controls the rotating of an additional threaded rod connected at a free end to an additional locking pin integral to an additional nut screwed to the rod, so that said additional pin engages, or disengages, said second zone of the body structure, thus securing the concerned roof element in such a position to said first and a second zones of the body structure.

16. The roof set forth in claim 1, wherein:

the vehicle has a longitudinal direction along which are located the front and a rear edges, the flexible means comprise cables, and, as much to secure, in a free manner, the roof elements together, whilst they are above the passenger compartment of the vehicle, placed substantially in continuity to each other, as to secure at least some of said roof elements to said front and rear parts of the structure, whilst said roof elements are in their second position, side by side, the rigid rods comprise at least two rods for each roof element to be secured, said (at least) two rods being threaded and controlled together in rotation by intermediary transmitting means rotated by said cables, said at least two rods extending from said intermediary transmitting means along two opposing directions until passed the respectively front and rear ends of the concerned roof element, along a direction substantially parallel to the longitudinal direction of the vehicle, each of said rods ending with a nut screwed to the concerned rod, the nut being connected to a locking connector thus controlled in translation along said longitudinal direction of the vehicle in order to engage, or disengage, one of said front or rear parts of the body structure.

17. The vehicle set forth in claim 2, wherein:

it has a longitudinal direction along which are located the front and a rear edges, the flexible means comprise cables, and, as much to secure, in a free manner, the roof elements together, whilst they are above the passenger compartment of the vehicle, placed substantially in continuity to each other, as to secure at least some of said roof elements to said front and rear parts of the body structure, whilst the roof elements are in their second position, the rigid rods comprise at least two rods for each roof element to be secured, said at least two rods being threaded and controlled together in rotation by intermediary transmitting means rotated by said cables, said at least two rods extending from the intermediary transmitting means along two opposing directions until passed the respectively front and rear ends of the concerned roof element, along a direction substantially parallel to the longitudinal direction of the vehicle, each of said rods ending with a nut screwed to the concerned rigid rod, the nut being connected to a locking connector thus controlled in translation along said longitudinal direction of the vehicle in order to engage, or disengage, one of said front or rear parts of the body structure.

18. The vehicle set forth in claim 17, wherein, in their second position, the roof elements are side by side.

19. The roof set forth in claim 16, wherein, to secure said roof elements together, the nut connected to one of the rods of one of the roof elements defines a locking tab put into motion by the rod and adapted for hooking a complementary locking means fixed to another of said roof elements, the locking tab thus being movable in translation controlled by said rod itself driven by the concerned cable, in order to engage, or disengage, the complementary locking means, whilst the roof elements are placed substantially in continuity to each other.

20. The vehicle set forth in claim 17, wherein, to secure the front roof element to a zone of the body structure close to the windscreen of the vehicle, in said first position of the roof elements, whilst the latter are substantially aligned in continuity to each other, the nut connected to one of said threaded rods connected to the front roof element bears an attaching means, swivel mounted on the nut, controlled by said threaded rod, so as to freely reversibly engage a complementary attaching means fixed to said zone of the structure close to the windscreen of the vehicle.

21. The vehicle set forth in claim 2, wherein, in their second position, the roof elements are placed substantially horizontal, stacked one on top of the other.

22. The vehicle set forth in claim 2, wherein:
the flexible means comprise cables,
the vehicle further comprises a windscreen,
the front roof element is displaceable above the passenger compartment to close it, in said first position in which said front roof element substantially extends in continuity from the rear roof element, between said rear roof element and a zone of said front part of the body structure immediately next to the windscreen,
the front and rear roof elements are, in addition, displaceable together so as to be arranged side by side in said second position;
the flexible cables extend between the front and rear roof elements where they are connected to at least one of said corresponding connecting rods.

23. The vehicle set forth in claim 2, wherein:
to secure said front and rear elements to each other in the first position, the rod connected to the controlling means fixed to one of said front and rear roof elements is threaded and connected to a locking tab attached to said locking means,
the vehicle further comprises a windscreen,
the roof elements further comprise an intermediate roof element, between the front and rear roof elements,
the front roof element is displaceable above the passenger compartment to close it in said first position, in which it substantially extends in continuity from the rear roof element, between itself and a zone of said front part of the structure close to the windscreen,
and, to secure in said second position the intermediate roof element to a zone of the body structure of the vehicle, a complementary rod projects from the locking tab which is connected to the intermediate roof element, in the direction of said zone of the body structure, said complementary rod being fitted, at one end, with a pin which moves with said nut, said pin engaging, or disengaging, a housing located on said zone of the body structure, depending on the displacement direction of the nut.

24. The vehicle set forth in claim 1 or 2, wherein the front roof element and the rear roof element are rigid.

* * * * *